Inventors:
John F. Tritle,
Jacob W. McNairy,
by Harry E. Dunham
Their Attorney.

June 14, 1938.   J. F. TRITLE ET AL   2,120,957
CONTROL SYSTEM
Filed April 24, 1937   3 Sheets-Sheet 3

Inventors:
John F. Tritle,
Jacob W. McNairy,
by Harry E. Dunham
Their Attorney.

Patented June 14, 1938

2,120,957

UNITED STATES PATENT OFFICE 2,120,957

CONTROL SYSTEM

John F. Tritle and Jacob W. McNairy, Erie, Pa., assignors to General Electric Company, a corporation of New York Application April 24, 1937, Serial No. 138,818

27 Claims. (Cl. 172—179)

Our invention relates to control systems, more particularly to motor control systems for electric vehicles, such as electric cars, elevators and the like, and has for an object the provision of a simple, reliable, and inexpensive control system of this character.

In a copending sole application of John F. Tritle Serial No. 131,391, filed March 17, 1937, which application is assigned to the same assignee as the present invention is disclosed an improved motor control system for electric vehicles in which the vehicle motors are accelerated by excluding resistance from the motor circuits through timed operation of a resistance controller. The resistance controller is operable between two positions and during operation in one direction excludes a first resistor from the motor circuit, suitable transfer means associated with the controller being arranged for operation upon exclusion of the first resistor for quickly excluding other resistors and reinserting the first resistor in the motor circuit for exclusion a second time during return operation of the resistance controller to its first position.

In order to provide for uniformly smooth dynamic braking of the vehicle over a wide range of speeds, the controller in the system disclosed in the said Tritle application is arranged for operation through four trips between its two positions during braking, progressively to exclude the braking resistance as the vehicle slows down, and the transfer means is arranged to exclude quickly selected other resistors and to reinsert quickly the first resistor upon the completion of each trip of the controller. The speed of operation of the resistance controller is governed by a current responsive relay during both acceleration and braking, and field shunting means are provided for controlling the motor fields during both the initial and the final acceleration of the vehicle.

Since it is often necessary to initiate braking with the vehicle operating at approximately its maximum speed, a relatively large amount of braking resistance is normally connected initially in the braking circuit for progressive exclusion as the vehicle slows down. Therefore when it is necessary to initiate braking at a lower speed, a portion of this resistance must be excluded from the braking circuit before the motors will build up as series generators to provide dynamic braking.

It is of course highly important that the dynamic braking become effective immediately when called for, regardless of the speed at which the vehicle is operating, and in a copending sole application of Jacob W. McNairy Serial No. 139,487, filed April 28, 1937, which application is assigned to the same assignee as the present application, is disclosed and broadly claimed a system of the type described above including means for operating the resistance controller during coasting to predetermine in accordance with the speed of the vehicle the amount of resistance initially included in the dynamic braking circuit. In the system disclosed in the said McNairy application, the initiation of the braking operation is controlled by unshunting the motor fields which are shunted during the coasting operation.

While we have shown our invention as applied to a system containing the above mentioned features described in the aforesaid Tritle and McNairy sole applications, these features are the invention of the said Tritle and McNairy respectively and claimed in the aforesaid sole applications, and we therefore do not claim them herein. For purposes of clarity certain features of our present joint invention are disclosed in the aforesaid sole applications, the present invention being an improvement of the said sole inventions.

In carrying out our invention, we provide relay means operable through a plurality of positions in accordance with the motor speed during motoring operation for controlling the operation of the resistance controller during coasting so as to predetermine prior to the initiation of the braking operation the amount of resistance for inclusion in the braking circuit.

This relay means in accordance with our invention includes an operating element movable through a plurality of positions during running operation in accordance with the speed of the motors and means for latching the relay in a position corresponding to the motor speed at the instant the master control means is operated to its coasting position. In addition, we provide means including the relay contacts and the latching means for independently operating the resistance controller and the associated transfer means to adjust quickly during coasting in accordance with the latched position of the relay the amount of resistance to be included in the braking circuit, the resistance controller being operable through a maximum of one trip during the coasting operation and the braking operation being initiated by movement of the master control means to its braking position so as to unshunt the motor fields.

In addition, a field flashing battery is provided which is arranged to energize the motor field windings during coasting so as to ensure quick build-up of the dynamic braking current when the motor fields are unshunted, the battery being so connected to the motor circuit that the current flows therethrough after the dynamic braking current is built up and thereby charges the battery.

Furthermore, the field shunting switch, which is utilized to control the unshunting of the motor fields to initiate the braking operation in accordance with the said McNairy application, is also utilized by us during running operation to control the field excitation of the motors during both the initiation and the completion of the acceleration. This field shunting switch is provided with a plurality of normally closed contacts for shunting the motor fields and with pressure responsive means for sequentially operating the contacts to their open circuit positions to unshunt the motor fields. Suitable valve means are provided for selectively connecting the pressure responsive means to a source of pressure at the beginning of the accelerating operation so as to unshunt the field windings and for connecting the pressure responsive means to exhaust to shunt the field windings at the completion of the accelerating operation.

A valve controlled by the same current responsive means that controls the speed of operation of the resistance controller is provided for controlling the exhaust passage of the field shunting switch so as to control the rate at which the motor fields are shunted at the completion of the accelerating operation.

This current responsive means which controls the movement of the resistance controller and the field shunting switch is provided with an operating winding for effecting closure of a pair of contacts in accordance with the motor current and with a shunt winding energizable upon closure of the contacts for opposing the operating winding so as immediately to open the contacts and thus provide a vibrating characteristic.

For a more complete understanding of our invention, reference should now be had to the accompanying drawings in which.

Referring now to the drawings, we have shown our invention as embodied in a control system for a plurality of traction motors 10 to 13 inclusive having series field windings 14 to 17 inclusive, respectively. As shown, the principal elements and devices incorporated in our improved control system comprise a plurality of motor controlling resistors 18, 19, 20, 21 and 22; field shunting means 23 for the field windings 14 to 17 inclusive; a fluid pressure operating device 24 for driving a controller 25 associated with the resistor 18; a cam switch 26 also driven by the operating device 24; an accelerating and decelerating relay 27 for controlling the speed of operation of the field shunting means 23 and the operating device 24 in accordance with the motor current; and master control means including a master accelerating controller 28 and a master braking controller 29.

Figure 9:
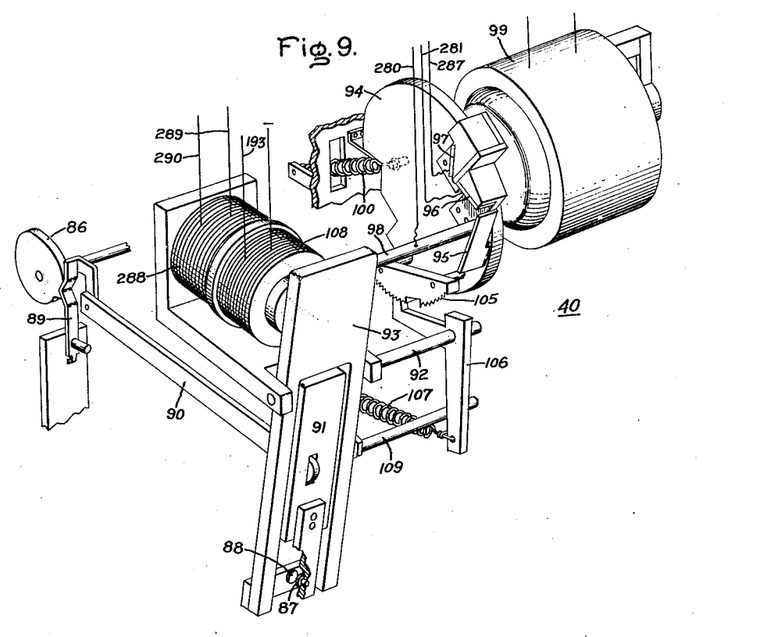
Fig. 9 is a skeleton perspective view of the relay means for controlling the operation of the resistance controller during coasting.

In addition, the control system includes a pair of line circuit breakers 30 and 31 for connecting the motors to the source of energy represented by a trolley 32 and a ground connection 33; a braking switch 34 having a plurality of main contacts 35, 36 and 37 for connecting the motors in a dynamic braking circuit with the motor controlling resistors; a cushioning contactor 38 for controlling the resistor 20; a transfer switch 39 which cooperates with the controller 25 to control the resistors 18 and 19 and a spotting relay 40, the mechanical details of which are shown in Fig. 9, for controlling the operation of the operating device 24, the cushioning contactor 38, and the transfer means 39 during coasting to predetermine the amount of resistance initially included in the braking circuit in accordance with the speed of operation of the vehicle.

Inasmuch as complete understanding of our invention may best be had from a description of the operation, certain of the operating devices and elements will first be briefly described and the operation will then be set forth in detail.

Figure 1:
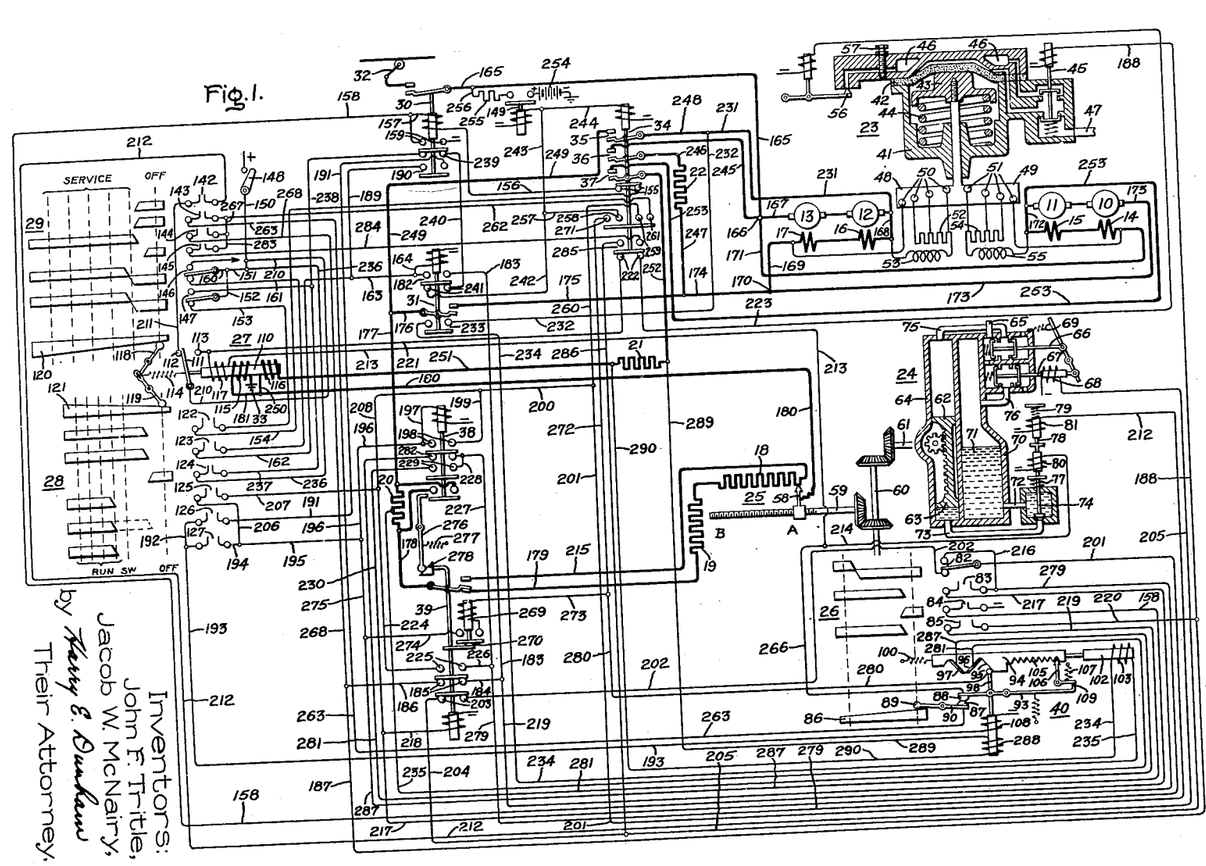
Fig. 1 is a somewhat diagrammatic illustration of a control system embodying our invention.

The field shunting means 23, as shown, comprises a multiple contact pressure operated switch for progressively shunting the motor fields. This pressure operated switch comprises a casing 41 having a flexible diaphragm 42 for controlling a plunger 43 which is normally biased to its uppermost position by a spring 44. Fluid pressure is supplied to the upper side of the diaphragm 42 from a suitable source of pressure through an electrically controlled valve 45 which is normally biased to the position shown to connect the upper side of the diaphragm to atmosphere through the upper port of the valve 45 and an exhaust passageway 46. When the operating winding of the valve 45 is energized, the valve is operated to its lowermost position to connect the upper side of the diaphragm to a suitable source of fluid pressure through the lower port of the valve and a supply conduit 47, and the plunger 43 is thereupon moved downwardly against the bias of the spring 44.

Mounted on the lower end of the plunger 43 we provide a plurality of cooperating field shunting contacts which for purposes of illustration are shown as comprising a pair of conducting segments 48 and 49 arranged normally to engage cooperating sets of fixed contacts 50 and 51 respectively. As shown, the contacts 50, in cooperation with the conducting segment 48, control a shunt circuit for the field windings 16 and 17, which shunt circuit includes a tapped resistor 52 and a reactor 53. Similarly, the contacts 51 and the conducting segment 49 control a shunt circuit for the field windings 14 and 15, which shunt circuit includes a tapped resistor 54 and a reactor 55. With the conducting segments 48 and 49 in the normal position shown, the field windings are completely shunted, only the reactors 53 and 55 being included in the shunt circuits. As the conducting segments 48 and 49 move downwardly upon the application of fluid pressure to the upper side of the diaphragm 42, the contacts 50 and 51 are progressively disengaged so as to insert the resistors 52 and 54 in the shunt circuits, the final movement of the segments 48 and 49 completely interrupting the shunt circuits.

In order to control the speed at which the conducting segments 48 and 49 move upwardly when the upper side of the diaphragm 42 is connected to the exhaust passageway 46 and thus to control the rate at which the fields are shunted, we provide the exhaust passageway 46 with an electrically operated plug valve 56 so as selectively to restrict the exhaust passageway and thus substantially arrest movement of the segments 48 and 49 when the plug valve 56 is closed. In addition, the exhaust passageway 46 is provided with an adjustable needle valve 57 by means of which the rate at which pressure will be exhausted from the upper side of the diphragm may be initially adjusted.

The controller 25 may be of any suitable type, but, as stated in the above referred to Tritle application, is preferably of the commutator type described and shown in another copending application of John F. Tritle, Serial No. 22,745, filed May 22, 1935, entitled "Control systems", which application is assigned to the same assignee as the present invention. For purposes of illustration, the controller 25 is here shown as comprising a movable brush arm 58 mounted for axial movement along a rotatable shaft 59 to vary the resistor 18.

As shown, the rotatable shaft 59 is connected through suitable gearing to an intermediate shaft 60 which is in turn connected to the operating shaft 61 of the fluid operating device 24. This fluid operating device comprises a pair of opposing pistons 62 and 63 reciprocating within a cylinder casing 64 and connected as shown by means of a suitable rack and pinion to the operating shaft 61. Fluid pressure is supplied from a suitable source (not shown) through a supply pipe 65 and is controlled by a pair of double acting valves 66 and 67 which are interconnected for operation by a single operating winding 68, the valves being biased to the position shown by means of a spring 69. Adjacent the cylinder casing 64 is a timing chamber 70 within which is a body of incompressible liquid 71, such for example as oil, which body communicates with the lower side of the piston 63 through suitable conduits 72 and 73 and a restricted orifice controlled by a valve 74.

Thus, when the operating winding 68 is de-energized, pressure is admitted directly from the supply pipe 65 through the left-hand port of the valve 66 and through a conduit 75 to the piston 62 so as to force the reciprocating pistons downwardly to the position shown, the movable arm 58 of the controller 25 being thus operated to the position indicated by the letter A in the drawings. Likewise, when the operating winding 68 is energized, the valves 66 and 67 are reversed so that the fluid pressure on the piston 62 is exhausted to atmosphere through the right-hand port of the valve 66 and fluid pressure is admitted through the left-hand port of the valve 67 to the conduit 76 and the timing chamber 70. The incompressible liquid 71 is thus forced through the conduits 72 and 73 and through the restricted orifice controlled by the valve 74 so as to operate the piston 63 upwardly and move the brush arm 58 of the controller 25 in a left-hand direction from the position A toward the position indicated by the letter B in the drawings.

It will now be apparent that the speed at which the reciprocating pistons 62 and 63 move in either direction depends upon the degree of restriction interposed by the valve 74 to the flow of the incompressible liquid through the conduits 72 and 73. Normally this valve is biased to the partially open position, shown by a spring 77, in which position the upper end of the valve stem engages a stop pin 78 which is normally biased to the position shown by a spring 79. The valve 74 is provided with an energizing winding, or stop coil, 80 and the stop pin 78 is controlled by a similar energizing winding or speed coil 81. Thus, when the winding 80 is energized, the valve 74 is moved downwardly against the bias of the spring 77 to close the conduit 73 and stop the movement of the pistons 62 and 63 by preventing the flow of the incompressible liquid 71 through the conduit. When both of the windings 80 and 81 are deenergized, the pistons operate at a normal or low speed, the flow of fluid being partially restricted by the valve 74, and when the winding 81 is alone energized so as to retract the stop pin 78, the valve 74 is opened further by the spring 77 to increase the size of the flow controlling orifice in the conduit 73 and thus provide for high speed operation of the pistons 62 and 63.

Mounted on the intermediate shaft 60 for movement with the brush arm 58 is the cam switch 26 which is provided with a plurality of pairs of contacts 82, 83, 84, and 85, arranged to be operated between open and closed circuit positions by a plurality of associated cams. In addition, the cam switch 26 is provided with a cam 86 for controlling a movable contact 87 which is arranged in cooperating relation with a contact 88 on the spotting relay 40. This cam 86 and its relation to the spotting relay 40, while illustrated diagrammatically in Fig. 1, is best illustrated in Fig. 9.

Referring to Fig. 9, the cam 86 is provided with a follower 89 which carries one end of a lever 90, the other end of which is secured to a pivoted arm 91 which carries the contact 87, the arm 91 being pivoted on a pin 92 which pivotally supports the armature 93 of the spotting relay 40, the lower end of the armature 93 carrying the cooperating contact 88. Normally, the pivoted armature 93 is biased for movement in a clockwise direction about its pivot, as viewed in both Figures 1 and 9, to separate the contacts 87 and 88, the movement of the armature 93 and accordingly the separation of the contacts being determined by a cam disk 94 which is provided with a plurality of cam surfaces 95, 96, and 97 for engaging a conducting finger 98 which extends outwardly from the upper end of the armature 93. As shown, the cam surfaces 96 and 97 comprise conducting segments for a purpose to be more fully described hereinafter.

Figures 10, 12:
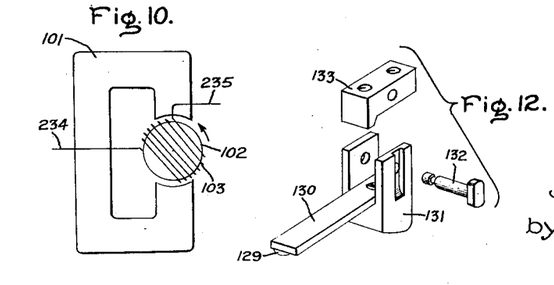
Fig. 10 is a schematic illustration of the arrangement of the rotor of the relay means shown in Fig. 9.
Fig. 12 is a detail view in exploded perspective of one of the contacts of the cam switch shown in Fig. 11.

The cam disk 94 is supported on the rotatable shaft (not shown) of an operating element 99 which is shown somewhat schematically in Fig. 10 and is normally biased by a spring 100 to the position shown in Fig. 1, suitable stops (not shown) being provided for limiting the movement of the cam disk 94. As will be more fully described hereinafter, the operating element of the spotting relay 40 comprises a magnetizable stator 101 (Fig. 10) having opposed pole pieces between which is mounted a magnetizable rotor 102 having an operating winding 103 which is connected, as shown in Fig. 1, for energization in accordance with the current flowing through two of the motor fields. Thus, the cam disk 94 is arranged for operation in a clockwise direction, as viewed in Fig. 9, or in a right-hand direction, as viewed in Fig. 1, from its biased position.

As shown, the cam disk 94 is also provided with a toothed segment 105 arranged to be engaged by a latch 106 which is biased for movement toward latching position by a spring 107, and the magnetizable armature 93 is provided with an energizing winding 108 arranged to operate the armature in a counterclockwise direction about its pivot from the position shown. Whenever the winding 108 is energized, a pin 109 carried by the armature 93 operates the latch 106 so as to release the cam disk 94 for movement by the operating element 99 in accordance with the speed of the motors, and as soon as the winding 108 is deenergized, the cam disk 94 is latched in the position it then occupies, one of the cam surfaces 95, 96, or 97, then serving to limit the clockwise movement of the armature 93 so as to determine the amount of separation of the contacts 87 and 88.

These contacts 87 and 88 control the stop coil 80 of the operating device 24 in a manner to be more fully described hereafter, and accordingly whenever the contacts 87 and 88 are separated, the cam switch 26 operates in a direction to move the contact 87 by means of cam 86 toward the contact 88 until the contacts are engaged, whereupon the stop coil 80 is energized to stop the operating device 24, the controller 25, and the cam switch 26.

The accelerating relay 27, which controls the speed of operation of the operating device 24 and the field shunt means 23 under certain conditions, is mounted adjacent the master controllers 28 and 29 and comprises a movable armature or core 110 for operating a pivoted contact member 111 having cooperating front and back contacts 112 and 113 respectively. The contact member 111 is normally biased into engagement with the front contact 112 by a spring 114 and the armature 110 is provided with a pair of series windings 115 and 116, the winding 115 being connected in the accelerating circuit and the winding 116 being connected in the braking circuit.

In addition, we provide the accelerating and decelerating relay 27 with a shunt winding 117 associated with the movable core 110 and arranged magnetically to oppose the series coils 115 and 116, the energization of the shunt winding 117 being controlled by the back contact 113 in a manner to be more fully described hereinafter. The current setting of the accelerating and decelerating relay 27 is determined by the spring 114, one end of which is connected to a pair of pivoted adjusting arms 118 and 119, the arm 118 being arranged to engage a cam 120 carried by the braking controller 29, while the arm 119 engages a similar cam 121 carried by the master accelerating controller 28. Thus, it will be seen that upon movement of either of the controllers 28 or 29 from their respective off positions, the spring 114 will be stressed to increase the current setting of the relay 27.

As shown, the accelerating controller 28 is provided with a plurality of cam switches 122 to 127 inclusive arranged for operation by a plurality of corresponding cams. This master accelerating controller 28 is movable from an off position through a switching position and a plurality of running positions and, as will be more fully described hereinafter, we have found that it is desirable in the operation of our invention to arrange the cam switch 126 so that it is always open when the master controller is in the off position, is always closed when the master controller is in its running position, but may be open or closed when the controller is passing through the switching position, depending upon whether the master controller is being advanced from or returned to the off position. This arrangement of the cam switch 126 is indicated diagrammatically in Fig. 1 by showing a portion of the associated cam in broken lines and the preferred construction of this cam switch is illustrated in Figs. 11 and 12.

Figure 11:
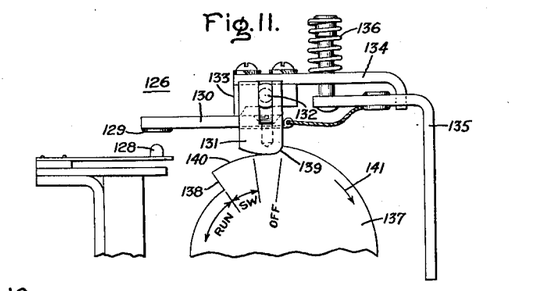
Fig. 11 is a fragmentary detail view of one of the cam switches associated with the master control means and the associated operating cam therefor.

Referring now to Figs. 11 and 12, the cam switch 126 is shown as comprising a stationary contact 128 mounted on a suitable support, and a cooperating movable contact 129 carried on a contact finger 130 which is secured to a friction shoe 131 pivotally supported on a pin 132. The pin 132 extends through a bearing block 133 carried by a second finger 134 which is pivotally mounted on a suitable support 135 and biased by a spring 136 for counterclockwise movement about its pivot, as viewed in Fig. 11. The lower surface of the friction shoe 131 is arranged as shown to engage the periphery of a cam 137 which is provided with a pair of shoulders 138 and 139 and with a friction surface 140 extending between the shoulders.

In Fig. 11, the cam switch 126 is shown in the position occupied when the master controller 28 is in its off position and it will be apparent that when the master controller is moved toward its running position so as to rotate the cam 137 in the direction indicated by the arrow 141, the frictional engagement between the surface 140 and the friction shoe 131 will effect counterclockwise rotation of the friction shoe 131 and the arm 130 about the pivot pin 132 so as to engage the contacts 128 and 129. These contacts will remain in engagement throughout the movement of the master controller to its running position, the friction shoe 131 passing over the edge of the shoulder 138 to permit counterclockwise movement of the finger 134 in accordance with its bias as soon as the master controller reaches its first running position. Thus, it will be seen that the contacts are closed during movement of the master controller through switching position toward running position.

When the master controller is moved back toward its off position, however, the contacts are open during movement through the switching position. At the beginning of this movement, the friction shoe 131 is lifted by the shoulder 138 so as to move the arm 134 in a clockwise direction about its pivot against the pull of the spring 136 and during movement through the switching position, the frictional engagement between the shoe 131 and the surface 140 effects clockwise movement of the shoe 131 and the arm 130 about the pivot 132 so as to ensure that the contacts 128 and 129 are open, and accordingly, when the controller reaches its off position, the parts will be in the position shown in Fig. 11. Thus, it will be seen that the cam switch 126 may be either open or closed during movement through the switching position, depending upon the direction in which the master controller 28 is being moved.

Referring again to Fig. 1, the master braking controller is provided with a plurality of cam switches 142 to 147 inclusive arranged for operation by suitable corresponding cams and is movable from an off position through a plurality of service positions. When the two master controllers 28 and 29 are in their respective off positions, the circuit connections obtained, as will be described more fully hereinafter, provide for coasting operation of the vehicle.

It is now believed that a complete understanding of our invention may be had from a description of the operation of the system as a whole.

Referring now to Fig. 1, in which all of the control devices are shown in their respective de-energized positions, in order initially to energize the control circuits preparatory to acceleration of the vehicle, it is necessary first to close a control switch 148 which connects the control apparatus to a suitable source of control energy, which source has been indicated by conventional plus and minus signs in order to simplify the drawings.

Since the master controller 28 and the braking controller 29 are in their respective off positions corresponding to coasting operation, closure of the control switch 148 completes energizing circuits for the braking switch 34 and for a field flashing contactor 149 to establish the coasting circuits shown in Fig. 3, which circuits will be fully described hereinafter. The motors may now be connected to the main source of energy for acceleration by operating the master controller 28 from its off position to its switching position so as to open the normally closed cam switch 124 and to close the cam switches 122 and 123. Closure of the cam switches 122 and 123 establishes energizing circuits for the line circuit breakers 30 and 31 to connect the motors in the accelerating circuit shown in Fig. 2.

The energizing circuit for the line breaker 30 may be traced from the positive source of control energy through the control switch 148, the conductors 150, 151, and 152, the lower contacts of the cam switch 147 on the braking controller 29, the conductor 153, the cam switch 122, the conductor 154, the interlock contacts 155 on the braking switch 34, the conductor 156, the energizing winding of the line breaker 30, the conductors 157 and 158, and by way of the contacts 84 on the cam switch 26 to the negative source of control energy.

It will of course be apparent that the contacts 84 on the cam switch 26 are closed only so long as the cam switch 26 is in its A position and as soon as the line breaker 30 closes, a self-holding circuit is established which extends from the intersection of the conductors 157 and 158 through the interlock contacts 159 on the line breaker 30 to the negative source of control energy. This holding circuit bypasses the contacts 84 so as to maintain the line breaker 30 energized even though the cam switch 26 and the controller 25 are operated from their respective A positions.

Similarly, the energizing circuit for the line breaker 31 may be traced from the positive source of control energy through the control switch 148, the conductors 150, 151 and 160, the lower contacts of the cam switch 146 on the braking controller 29, the conductor 161, the cam switch 123 on the master controller 28, and by way of the conductors 162, 163, and 164 to an operating winding of the line breaker 31 and the negative source of control energy.

Figure 2:
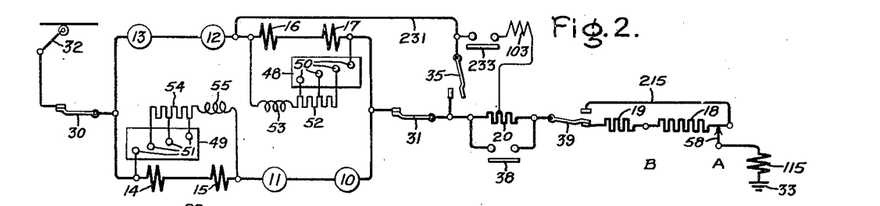
Figs. 2 to 8 inclusive are simplified circuit diagrams illustrating various stages in the accelerating and braking operation.

Upon closure of the line breakers 30 and 31, the motors are connected in the accelerating circuit shown in Fig. 2 with the motor fields shunted and the main power circuit thus established for the motors may be traced from the trolley 32 through the contacts of the line breaker 30 and a conductor 165 to a common connection point 166. At this common connection point 166, the current divides, part flowing through the conductor 167, the armatures of the motors 13 and 12, the conductor 168, the field windings 16 and 17, and by way of a conductor 169 to a second common connection point 170, while the other part of the current flows from the common connection point 166 through a conductor 171, the field windings 14 and 15, a conductor 172, the armatures of the motors 11 and 10, and by way of a conductor 173 to the common connection point 170.

From this common connection point 170, the current flows through the conductors 174 and 175, the contacts of the line breaker 31, the conductors 176 and 177, the resistor 20, a conductor 178, the lower contacts of the transfer switch 39, a conductor 179, the resistors 19 and 18, the movable brush arm 58 of the controller 25, the conductors 180 and 181, and by way of the series winding 115 on the accelerating relay 27 to the ground connection 33.

As shown best in Fig. 2, the traction motors are thus permanently connected in a parallel bridge circuit with two of the motors connected in each arm of the bridge between the common connection points 166 and 170.

As explained above, the field shunting means 23 normally occupies a position to shunt the field windings of the motors and accordingly the motors now begin to accelerate with the field shunted. Closure of the line breaker 31, however, is effective to complete a circuit for the operating valve 45 of the field shunting means 23 and accordingly the pressure is immediately applied to the upper side of the diaphragm 42 so as to move the conducting segments 48 and 49 downwardly progressively to unshunt the field windings. This energizing circuit for the valve 45 may be traced from the intersection of the previously energized conductors 163 and 164 through the interlock contacts 182 on the line breaker 31, the conductors 183 and 184, the interlock contacts 185 on the transfer switch 39, and by way of the conductors 186, 187, and 188 through the energizing winding of the valve 45 to the negative source of control energy.

As explained above, movement of the master controller 28 from its off position toward its running positions effects closure of the cam switch 126, while the master controller is in its switching position. Closure of this cam switch 126 establishes an energizing circuit for the latch coil 108 on the spotting relay 40 so as to release the cam disk 94 for movement in accordance with the speed of the motors for a purpose to be more fully described hereinafter. This energizing circuit for the latch coil 108 may be traced from the intersection of the previously energized conductors 162 and 163 through a conductor 189, the interlock contacts 190 on the line breaker 30, a conductor 191, the cam switch 126, the conductors 192 and 193, and by way of the latch coil 108 to the negative source of control energy.

In order further to accelerate the motors after the field shunts have been removed, it is necessary to operate the master controller 28 from its switching position to a running position to effect closure of the cam switches 125 and 127. Closure of the cam switch 127 establishes an energizing circuit for the cushioning contactor 38 so as quickly to exclude the resistor 20 from the motor circuit and therefore effect further acceleration of the motors. This energizing circuit for the cushioning contactor 38 may be traced from the intersection of the previously energized conductors 192 and 193 through the cam switch 127, and by way of the conductors 194, 195, 196, and 197 to an energizing winding of the cushioning contactor 38 and the negative source of control potential.

Immediately upon closure of the cushioning contactor 38, an energizing circuit is established for the winding 68 of the operating device 24 so as to move the valves 66 and 67 and thereby apply pressure to the timing chamber 71 whereby the pistons 62 and 63 of the operating device 24 are moved in a direction to operate the brush arm 58 of the controller 25 from its A position toward its B position so as progressively to exclude the resistor 18 from the motor circuit.

The energizing circuit for the winding 68 of the operating device 24 may be traced from the intersection of the previously energized conductors 196 and 197 through the interlock contacts 198 on the cushioning contactor, conductors 199, 200, and 201, the lower end of the contacts 82 on the cam switch 26, the conductor 202, the interlock contacts 203 on the transfer switch 39, and by way of the conductors 204 and 205 to the winding 68 and the negative source of control potential. In order to ensure further speed up the rate of acceleration provision is made that the winding 68 shall be energized even before the cushioning contactor 38 closes. To effect this a parallel energizing circuit is established which bypasses the interlock contact 198 on the cushioning contactor 38. This parallel circuit may be traced from the intersection of the conductors 194 and 195 through the conductor 206, the cam switch 125, and by way of the conductors 207 and 208 to the intersection of the conductors 199 and 200, from which point the energizing circuit is identical with the circuit just traced.

As soon as these energizing circuits for the winding 68 are completed, the operating device 24 begins to move at its high speed, due to the fact that the speed coil 81 is now energized. The energizing circuit for this speed coil 81 may be traced through the control switch 148, conductor 150, 210, the switch arm 111 on the accelerating relay 27 which now engages its front contact 112, a conductor 211, the normally closed cam switch 142 on the braking controller 29, and by way of a conductor 212 to the speed coil 81 and the negative source of control energy.

As the brush arm 58 moves from its A position toward its B position, the accelerating relay 27 operates to control the speed of the operating device 24 so as to maintain a substantially constant accelerating current. So long as the accelerating current is below a predetermined value, the accelerating relay occupies the position shown, thereby energizing the speed coil 81 of the operating device 24. As soon as the motor current increases above a predetermined value, however, the resulting increase in the energization of the series winding 115 effects movement of the armature 110 so as to disengage the contact 111 from the front contact 112, whereupon the speed coil 81 is deenergized and the operating device 24 slowed down so as to drive the brush arm 58 at its normal or low speed.

Both the speed coil 81 and the stop coil 80 now being deenergized, the valve 74 occupies the position shown in the drawings which corresponds to the normal or low speed of the operating device 24, but if the motor current continues to increase, the armature 110 on the accelerating relay 27 will be further operated so as to engage the movable contact 111 with the back contact 113 and thereby establish an energizing circuit for the stop coil 80. This energizing circuit extends from the movable contact 111 on the accelerating relay through the back contact 113, the shunt winding 117 on the accelerating relay, and by way of the conductors 213 and 214 to the stop coil 80 and the negative source of control energy. Energization of the stop coil 80 is of course effective to close the valve 77 and thereby arrest movement of the operating device 24 and the brush arm 58 of the controller 25.

We have found that if the operating device 24 is thus stopped and held by the stop coil until the motor current drops to such a value that the series winding 115 of the accelerating relay releases the armature 110 for movement to disengage the pivoted contact 111 from the back contact 113, the brush arm 58 moves forward in a series of steps of such duration as to cause the motor current to undergo severe fluctuation. Accordingly, we have arranged the shunt coil 117 on the relay so as to oppose the series winding 115 and cause the energizing circuit for the stop coil 80 to be interrupted immediately after this energizing circuit is closed. Thus, by connecting the shunt coil 117 for energization simultaneously with the stop coil 80, we provide a vibrating characteristic which causes an exceedingly slow gradual movement of the brush arm 58, the speed of which depends upon the time that the contacts 111 and 113 remain closed. Thus, if a heavy current flows in the motor circuit, the contacts 111 and 113 remain closed a greater portion of the time and a very slow speed movement of the controller is obtained. If a somewhat smaller current is flowing, the contacts 111 and 113 remain closed only a brief portion of the time and accordingly a higher controller speed is obtained. It will be understood of course that in each case assumed the motor current flowing is large enough to effect closure of the contacts 111 and 113 and likewise in each case the controller speed is less than the normal slow speed obtained when the movable contact 111 engages neither the front contact 112 or the back contact 113.

It will be observed that the master controller 28 is provided with a plurality of running positions and that movement of the master controller from one to the other of these running positions does not change the circuit connection, but serves only to increase or decrease the tension of the biasing spring 114 on the accelerating relay. Thus, the current setting of the relay is varied and the value of the motor current which will be maintained by the operating device 24 and the controller 25 is adjusted.

Figures 5, 6, 7, 8:
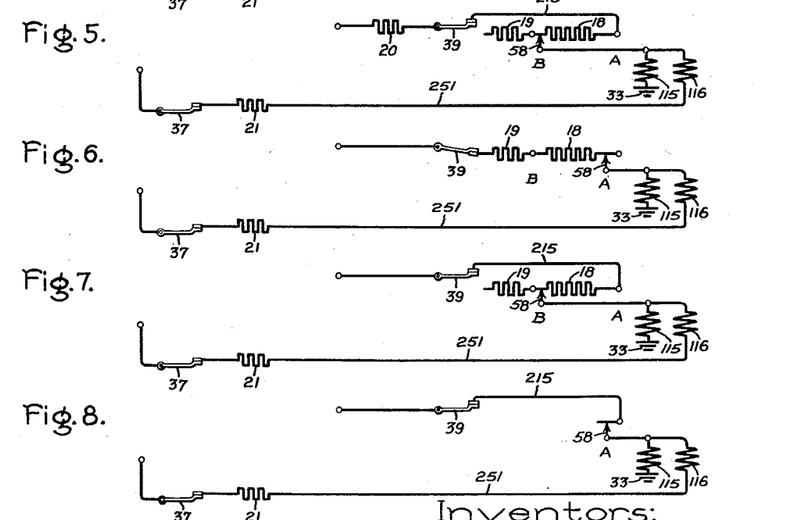

Continuing now with the description of the operation, it will be seen upon reference to Fig. 2 that as the brush arm 58 moves from its A position toward its B position, the resistor 18 is progressively excluded from the motor circuit so that when the brush arm 58 reaches its B position, only the resistor 19 is included in the motor circuit, the resistor 20 having been excluded by closure of the cushioning contactor 38. As soon as the brush arm 58 reaches its B position, the transfer switch 39 is energized so as to open its lower contacts and close its upper contacts, thereby excluding the resistor 19 from the motor circuit and reinserting the resistor 18, the circuit from the transfer switch now extending through a conductor 215 which is connected to the upper contact of the transfer switch and to the opposite end of the resistor 18. The circuit through the transfer switch, the conductor 215, the resistor 18, and the brush arm 58 is now substantially as shown in Fig. 5, the brush arm 58 being in its B position.

The above referred to energizing circuit for the transfer switch 39 may be traced from the intersection of the previously energized conductor 201 through the upper one of the contacts 82 on the cam switch 26, this upper contact being closed with the cam switch in its B position, and by way of a conductor 216, the contacts 83 on the cam switch 26, which also are now closed, the conductors 217 and 218 and the energizing winding of the transfer switch 39 to the negative source of control energy.

Upon operation of the transfer switch 39 to its uppermost position, the previously traced energizing circuit for the winding 68 of the operating device 24 is interrupted at the interlock contacts 203 and accordingly the valves 66 and 67 move to their respective biased positions shown so as to apply pressure to the piston 62 and connect the timing chamber 70 to atmosphere, thereby to effect operation of the pistons 62 and 63 in a reverse direction so as to move the brush arm 58 on the controller 25 from its B position toward its A position. It will likewise be observed that the interlock contacts 185 on the transfer switch 39 open to interrupt the energizing circuit for the valve 45 of the field shunting means 23. This valve is maintained energized, however, through a circuit bypassing the interlock contacts 185, which circuit extends from the intersection of the conductors 183 and 184 through a conductor 219, the contacts 85 on the cam switch 26, which are now closed, and, by way of the conductors 220 and 188, to the winding of the valve 45.

As the brush arm 58 moves from its B position toward its A position, the resistor 18 is again excluded from the motor circuit and it will be apparent that when the brush arm reaches its A position, all of the resistors 18, 19, and 20 are excluded from the motor circuit. As soon as the brush arm reaches this A position, the contacts 85 on the cam switch 26 open to de-energize the operating winding of the valve 45 on the field shunting means 23 and accordingly the valve moves to its biased position to connect the upper side of the diaphragm 42 to atmosphere through the exhaust passage 46, as described above. Therefore, the biasing spring 44 immediately begins to move the plunger 43 upwardly so as to operate the conducting segments 48 and 49 into sequential engagement with the cooperating contacts 50 and 51 progressively to shunt the field windings on the motors.

The speed at which the contacts 50 and 51 are sequentially engaged by the segments 48 and 49 is controlled by the accelerating relay 27 in a manner similar to that in which the operating device 24 is controlled. It will be observed that whenever the movable contact 111 of the accelerating relay engages the back contact 113, an energizing circuit is completed for the operating winding of the plug valve 56, which circuit extends from the back contact 113 through a conductor 221, the interlock contacts 222 on the braking switch 34, and, by way of a conductor 223, to the operating winding of the plug valve 56 and the negative source of control energy.

As described above, energization of the plug valve 56 restricts the exhaust passageway 46 and accordingly slows down the movement of the plunger 43 and it will be understood that the shunt coil 117 cooperates with the energizing winding of the plug valve 56 in the same manner as it cooperates with the stop coil 80 on the operating device 24 to provide a vibratory action. The shunt winding 117 under these conditions is energized in parallel circuit relation with the operating winding of the plug valve 56 through the previously traced energizing circuit for the stop coil 80. Upon completion of the field shunting operation, the motors are connected directly across the source of energy with all of the resistance excluded from the motor circuit and with the fields shunted. This constitutes the final accelerating connection.

It will be remembered that the energizing circuit for the transfer switch 39 includes the contacts 82 and 83 of the cam switch 26. In order to maintain the transfer switch 39 in its uppermost position when the cam switch 26 and the brush arm 58 return to their respective A positions to complete the accelerating operation, a holding circuit is provided for bypassing the contacts 82 and 83. This holding circuit, which is completed only when both the cushioning contactor 38 and the transfer switch 39 are in their respective energizing positions, extends from the intersection of the previously energized conductors 207 and 208 through a conductor 224, interlock contacts 225 on the transfer switch 39, the conductors 226, 227, and 228, the interlock contacts 229 on the cushioning contactor 38, and, by way of the conductors 230 and 218, to the energizing winding of the transfer switch 39 and the negative source of control energy. Thus, the final accelerating circuits are maintained until the master controller is returned to its switching position.

Before proceeding to a description of the braking operation, further details in the construction and operation of the spotting relay 40 will be described. As explained above, the operating element 99 of this relay includes a rotor having an energizing winding thereon. This winding is distributed over approximately 75% of the periphery of the rotor and we have found that with the axis of the rotor winding in any position other than at right angles to the axis through the center of the poles on the stator member 101, a component of magnetizing force is available for energizing the rotor structure. Thus an effect is obtained which is quite similar to the armature reaction that occurs in an ordinary electric motor when the brushes are displaced from the neutral position.

The relay is so arranged that when the cam disk 94 is in its normal biased position a portion of the rotor winding lies under the pole pieces and as the rotor moves, due to the magnetic force exerted by the magnetizing component, a greater portion of the winding moves out of the flux region between the pole pieces. This same movement, however, tends to increase the component of magnetizing force and by a combination of these two effects, together with a suitable proportioning of the biasing spring 100, the movement of the rotor is made a direct function of the current in the winding 103. In Fig. 10 the rotor is shown approximately in a mid-position and suitable stops (not shown) are provided for limiting the rotor to movement through an angle of approximately 45 degrees.

As explained above, the cam disk 94 and the rotor 102 are normally latched and as soon as the accelerating controller 28 is moved from its off position to its switching position, the cam switch 126 closes to energize the latch coil 108 through the energizing circuit traced hereinbefore. Thus, the rotor 102 and the cam disk 94 are released for movement and since the winding 103 is connected for energization in accordance with the current flowing through the motor fields, the disk 94 will assume a position depending upon the speed of the motors.

Referring to Fig. 1, the energizing circuit for the winding 103 may be traced from one side of the field winding 16 through the conductors 168, 231, and 232, the interlock contacts 233 on the line breaker 31, a conductor 234, the winding 103, a conductor 235, which is connected to a mid-tap on the resistor 20, and through part of the resistor 20, the conductors 177 and 176, the contacts of the line breaker 31, and the conductors 175, 174 and 169 to the opposite side of the field winding 17.

As shown best in Fig. 2, the winding 103 is thus connected across the field windings 16 and 17 and across a portion of the resistor 20, but since the resistor 20 is cut out of the circuit by operation of the cushioning contactor 38, as soon as the master controller is moved from its switching to the running position, the winding 103 is thereafter connected directly across the field winding. The reason for connecting the winding 103 to a tap on the resistor 20 is that frequently after a momentary braking operation at high speeds, the master controller 28 may be turned to the switching position and we have found that in this position there may not be sufficient current flowing through the motor fields properly to energize the spotting relay. By connecting the winding 103 as shown, additional voltage drop is made available for the winding 103 so that proper spotting may be obtained in the switching position.

It will be understood of course that the complete accelerating cycle described above, i. e. the progressive exclusion of the resistors 18, 19, and 20 takes place in a comparatively short time and before the speed of the car has assumed a very high value. After the final accelerating circuit is established, the car continues to accelerate, the final maximum speed being determined by the load and grade conditions. We have found that when power is initially applied to the motors and the spotting relay unlocked by energization of the latch coil 108, an inductive kick occurs which quickly moves the rotor 103 and the disk 94 of the spotting relay to this slow speed or right-hand position, as shown in Fig. 1, in which position it remains until the above referred to accelerating cycle is completed. As the car continues to accelerate thereafter, the voltage drop across the fields of course decreases and the disk 94 floats back toward the high speed position shown in direct accordance with the speed of the motors.

In describing the braking operation, it will first be assumed that the vehicle has been accelerated to approximately its maximum speed, say for example 40 miles per hour, at which speed the spotting relay 40 occupies the extreme left-hand position shown in Fig. 1.

The first step in initiating the braking operation is to move the master controller 28 from its running position to its off position, thus to open the cam switches 122, 123, 125, 126 and 127, and to close the cam switch 124. Opening of the above referred to cam switches of course interrupts the previously traced energizing circuit for the line switches 30 and 31, and the energizing circuit for the latch coil 108 of the spotting relay 40, whereupon the spotting relay 40 is latched in the high speed position shown.

Figures 3, 4:
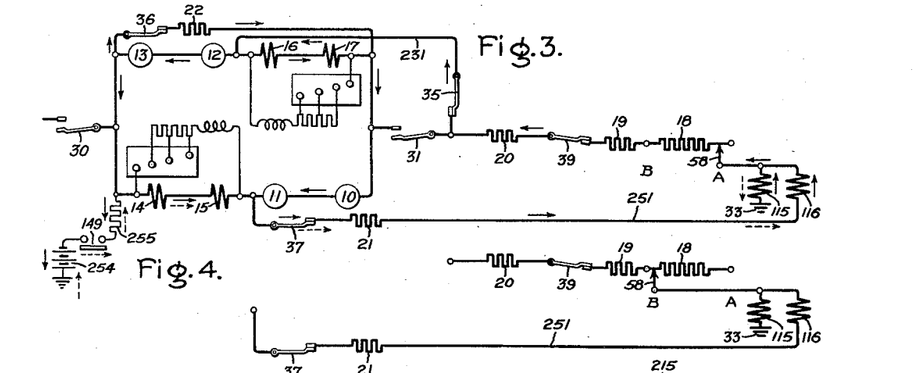

Closure of the cam switch 124 establishes energizing circuits for the braking switch 34 and the field flashing contactor 149 so as to connect the motors and the resistors in the braking circuit shown in Fig. 3. The field windings of the motors are shunted, as shown, since the master controllers 28 and 29 are in their respective off positions corresponding to coasting operation.

The energizing circuit for the braking switch 34 may be traced from the positive source of control energy through the control switch 148, the conductors 150 and 236, the cam switch 124, the conductors 237 and 238, the interlock contacts 239 on the line breaker 30, the conductor 240, the interlock contacts 241 on the line breaker 31, the conductors 242, 243, and 244, and by way of the energizing winding of the braking switch 34 to the negative source of control energy. The energizing circuit for the field flashing contactor 149 extends from the intersection of the conductors 243 and 244 through the winding of the field flashing contactor to the negative source of control energy.

Closure of the contacts 36 on the braking contactor 34 is effective to connect the resistor 22 across the two common connection points 166 and 170, the circuit extending from the connection point 166 through a conductor 245, the contacts 36, a conductor 246, the resistor 22, and by way of the conductors 247 and 174 to the common connection point 170. Likewise, closure of the contacts 35 and 37 on the braking switch 34 is effective to connect the resistors 18, 19, 20, and 21 in a braking circuit which extends between the mid-points of the two opposite arms of the parallel bridge circuit in which the motors are permanently connected. This braking circuit extends from the conductor 168 which connects the armature of the motor 12 to the field winding 16 through the conductors 231 and 248, the contacts 35, the conductors 249 and 177, the resistor 20, the conductor 178, the lower contacts of the transfer switch 39, the conductor 179, resistors 19 and 18, the movable brush arm 58, the conductors 180 and 250, the series winding 116 on the relay 27, a conductor 251, the resistor 21, a conductor 252, the contacts 37, and by way of a conductor 253 to the conductor 172 which connects the armature of the motor 11 to the field winding 15.

Thus, it will be seen that the resistors 18, 19, 20, and 21 are connected across two terminals of the bridge circuit, while the resistor 22 is connected across two other terminals of the bridge circuit. These connections are shown best in Fig. 3, and as is pointed out more fully in the above referred to sole Tritle application, these connections are particularly effective in providing automatic field shunting of the motors during the dynamic brake operation.

Energization of the field flashing contactor 149 is effective to connect a field flashing battery 254 across two of the motor fields so as to ensure quick build-up of the motors 10 and 11 as generator with shunt field characteristics. As shown in Fig. 1 the negative side of the battery is connected directly to ground and the flashing circuit for the field windings may be traced from the other side of the battery through the contacts of the field flashing contactor 149, a current limiting resistor 255, the conductors 256, 165, and 171, the field windings 14 and 15, the conductors 172 and 253, the contacts 37 on the braking switch 34, the conductor 252, the resistor 21, the conductor 251, the series winding 116 on the relay 27, the conductors 250 and 181, the series winding 115 on the relay 27, and by way of the ground connection 33 to the negative side of the battery.

In Fig. 3, the direction of the field flashing current is indicated by broken arrows and we have found that by properly proportioning the battery with relation to the voltage drops in the circuit during the dynamic braking operation, a portion of the braking current may be caused to flow through the battery in such a direction that the battery is charged during the braking operation. In Fig. 3, the braking current is indicated by solid arrows. It will be seen that a portion of this braking current flows through the current limiting resistor 255, the contacts of the field flashing relay 149, the battery 254, the ground connection 33, and the series winding 115 in a direction such that the battery is charged.

Simultaneously with the establishment of the above described circuits, an energizing circuit is established for the operating winding 68 of the operating device 24. The operating device 24 does not move, however, since an energizing circuit is simultaneously established for the stop coil 80. The energizing circuit for the operating winding 68 extends from the intersection of the previously energized conductors 242 and 243 through a conductor 257, a pair of interlock contacts 258 and 259 on the braking switch 34, and by way of a conductor 260 to the conductor 201 from which point the energizing circuit extends, as described above, through the conductor 201, the lower contacts 82 on the cam switch 26, the conductor 202, the interlock contacts 203 on the transfer switch 39, and by way of the conductors 204 and 205 to the winding 68. Similarly, the energizing circuit for the stop coil 80 extends from the previously referred to interlock contact 258 on the braking switch 34 through a similar interlock contact 261, a conductor 262, the cam switch 143 on the braking controller 29, a conductor 263, the contacts 87 and 88 on the spotting relay 40, and by way of the conductors 266 and 214 to the stop coil 80.

Thus, it will be seen that the traction motors are connected in a closed dynamic braking circuit with the fields flashed and the motors would of course build up as generators to effect dynamic braking, were it not for the fact that the fields are shunted by the field shunting means 23. At this time the motors build up with shunt characteristics to the extent possible with their shunted fields, the current in the braking circuit being too low to give any appreciable braking torque. In order to initiate braking now, it is necessary only to move the braking controller 29 from its off position to its braking position so as to energize the field shunting means 23 and thereby unshunt the field windings of the motor.

Movement of the braking controller 29 from its off position to a service position completes an energizing circuit for the operating winding of the valve 45 on the field shunting means, which circuit may be traced from the previously energized interlock contact 261 on the braking controller 34 through the conductors 262 and 267, the cam switch 144 on the braking controller 29, and by way of the conductors 268, 187, and 188 to the operating winding of the valve 45.

As soon as the motor fields are unshunted, the motors build up as series generators and the dynamic braking force becomes immediately effective. It will be remembered that the operating winding 68 of the operating device 24 is energized through a circuit previously traced and since movement of the braking controller to its service position is effective to deenergize the stop coil 80 on the operating device 24, by opening the cam switch 143, the operating device 24 begins to move in a direction to operate the brush arm 58 from its A position toward its B position progressively to exclude the resistor 18 from the braking circuit. The operating device 24, of course, moves at its normal low speed since the energizing circuit for the speed coil 81, which extends through the contact 112 on the relay 27 and the cam switch 142 of the braking controller, is now open at the cam switch 142.

As the brush arm 58 moves towards its B position, the relay 27 operates to control the speed of the device 24 and the brush arm, the series winding 116 of the relay 27 being connected in the braking circuit, as shown in Fig. 3. Whenever the braking current exceeds a predetermined value, the back contact 113 is engaged by the movable contact 111 to energize the stop coil 80, as described above in connection with the accelerating operation and thus the speed of operation of the brush arm 58 is controlled.

When the brush arm 58 reaches its B position, the resistor 18 is entirely excluded from the braking circuit, as shown in Fig. 4, and the transfer switch 39 will be immediately energized by closure of the upper one of the contacts 82 and the contacts 83 on the cam switch 26. The circuit for energizing the transfer switch 39 extends from the interlock contact 259 on the braking switch 34 through the conductors 260 and 201, the upper one of the contacts 82, the conductor 216, the contacts 83, and by way of the conductors 217 and 218 to the energizing winding of the transfer switch 39. Thus, the resistor 19 is quickly excluded from the braking circuit and the resistor 18 is reinserted, the connections being as shown in Fig. 5.

It will be observed that when the transfer switch 39 is operated to its uppermost position, a small auxiliary relay 269 is moved to its closed position by a finger 270 carried by the transfer switch, the relay 269 thereupon sealing itself closed through a circuit which may be traced from the previously energized interlock contact 258 on the braking switch 34, through a cooperating interlock contact 271, the conductors 272 and 273, the windings and the contacts of the relay 269, and by way of the conductors 274, 275, 196, and 197, through the energizing winding of the cushioning contactor 38 to the negative source of control energy.

It will thus be seen that with the braking switch 34 closed, operation of the transfer switch 39 to its uppermost position effects energization of the cushioning contactor 38. The cushioning contactor, however, is held against operation to its closed circuit position so long as the transfer switch 39 is in its uppermost position by a mechanical interlock comprising a pivoted lever 276 which is normally biased by a spring 277 to the ineffective position shown. Upon operation of the transfer switch 39 to its uppermost position, the lever 276 is moved by a cam 278 carried by the transfer switch so that the upper end of the lever 276 extends into the path of movement of the cushioning contactor 38 and thereby prevents operation of the cushioning contactor to its closed circuit position. It will be apparent, however, that the interlock lever 276 is effective to control the cushioning contactor 38 only if the transfer switch 39 is energized prior to energization of the cushioning contactor, since the cushioning contactor, once it has been operated to its closed circuit position, is not affected by operation of the interlocking lever 276.

As described above in connection with the accelerating operation, movement of the transfer switch 39 to its uppermost position interrupts the energizing circuit for the winding 68 at the interlock contacts 203 and accordingly the brush arm 58 immediately starts to move from its B position toward its A position again to exclude the resistor 18 from the braking circuit. As soon as the brush arm 58 reaches its A position, the contacts 83 on the cam switch 26 open to deenergize the transfer switch 39, whereupon the transfer switch moves to its lowermost position to reinsert the resistors 18 and 19 in the motor circuit, as shown in Fig. 6.

It will be remembered that the energizing circuit for the transfer switch 39 was initially completed through the upper one of the contacts 82 and the contacts 83 on the cam switch 26. Although the upper one of the contacts 82 is opened, as soon as the brush arm 58 and the cam switch 26 move from their respective B positions, the energizing circuit for the transfer switch 39 is maintained until the contacts 83 open through a circuit which by-passes the upper one of the contacts 82. This circuit extends from the previously energized interlock contact 259 through the conductors 260, 200, 208, and 224, the interlock contacts 225 on the transfer switch 39, and by way of the conductors 226 and 279 to the contacts 83 from which point it is identical with the energizing circuit previously traced.

Immediately upon operation of the transfer switch 39 to its lowermost position, the interlock lever 276 releases the previously energized cushioning contactor 38 for movement to its closed circuit position so as to exclude the resistor 20 from the braking circuit and accordingly the circuit connections shown in Fig. 6 are established. At the same time, the cushioning contactor 38 seals itself in through the interlock contacts 198, which contacts establish a short-circuit around the energizing winding on the auxiliary relay 269 to permit the relay to open. This short-circuit extends from the intersection of the conductors 196 and 197 in the energizing circuit of the relay 269 through the interlock contacts 198, the conductors 199, 200, and 260, and by way of the interlock contact 259 to the interlock contact 271 in the previously traced energizing circuit of the relay 269.

Upon operation of the transfer switch 39 to its lowermost position, the winding 68 of the operating device 24 is again energized through the interlock contacts 203 on the transfer switch and accordingly the brush arm 58 is again operated from its A position toward its B position to exclude the resistor 18 from the braking circuit a third time. As described above, as soon as the brush arm reaches its B position, the transfer switch 39 is energized through the upper one of the contacts 82 and the contacts 83 on the cam switch 26, whereupon the resistor 19 is again excluded from the braking circuit and the resistor 18 is reinserted, as shown in Fig. 7. Again, operation of the transfer switch 39 to its uppermost position interrupts the energizing circuit of the winding 68 at the interlock contacts 203 and accordingly the brush arm 58 moves from its B position toward its A position progressively to exclude the resistor 18 from the braking circuit a fourth time. The final braking position is shown in Fig. 8, all of the resistors 18, 19, and 20 being excluded from the braking circuit, only the resistor 21 being retained to prevent short-circuiting of the motors.

The transfer switch 39 is maintained energized upon return of the cam switch 26 to its A position at the completion of the braking operation by the holding circuit traced above in connection with the accelerating operation. Accordingly, the connections shown in Fig. 8 are maintained until the braking controller 29 is returned to its off position, and the accelerating controller 28 is operated to interrupt the energizing circuit for the braking switch 34.

As pointed out above, it is often necessary to initiate a braking operation before the vehicle has attained its maximum speed and in such cases it is desirable to exclude part of the braking resistance during the coasting operation so that the dynamic braking will become effective immediately upon operation of the braking controller to its service position. It will be remembered that during the accelerating operation, the cam disk 94 of the spotting relay 40 is operated quickly to its extreme right-hand or low speed position when power is first applied to the motors, the cam disk then moving back toward its left-hand or high speed position, shown, as the speed of the motor increases. Accordingly, when the vehicle is operating at less than its maximum speed, say for example 35 miles per hour, the cam disk occupies a position slightly to the right of that shown in Fig. 1, and if the master controller is returned to its off position under these conditions, the cam disk 94 is latched in a position such that the conducting finger 98 comes to rest part way up the cam surface 95, the latch coil 108 being deenergized by opening of the contacts 126.

With the cam disk 94 latched in this position, it will be seen that the contacts 87 and 88 are separated a short distance with the cam switch 26 in its A position and accordingly the previously traced energizing circuit for the stop coil 80 on the operating device 24 is interrupted. Therefore, as soon as the master controller is operated to its off position to establish the coasting circuits shown in Fig. 3, the operating device 24 begins to move the brush arm 58 toward its B position. This movement of the brush arm 58 continues until the contact 87 operated by the cam 86 on the cam switch 26 engages the contact 88 to energize the stop coil 80. Thus, a portion of the resistor 18 is excluded from the braking circuit during coasting operation and as soon as the braking controller 29 is operated to its service position to unshunt the motor fields, as described above, the braking current builds up immediately to the predetermined value maintained by the relay 27. In other words the resistance is preselected to give a predetermined braking torque.

As mentioned above, operation of the braking controller to its service position interrupts at the cam switch 143, the energizing circuit extending through the contacts 87 and 88 for the stop coil 80 and thus leaves the stop coil 80 under the control of the relay 27. Therefore, the brush arm 58 immediately begins moving toward its B position and the remainder of the braking operation is carried out as described above.

If the vehicle is operated at a still lower speed, say 30 miles per hour, when it is desired to initiate braking, the cam disk 94 will be still further to the right when latched, upon operation of the controller 28 to its off position, and accordingly the conducting finger 98 comes to rest in the apex of the notch between the cam surfaces 95 and 96 in engagement with the conducting surface 96. Since the contacts 87 and 88 are separated, the operating device 24 immediately begins to move the brush arm 58 toward its B position and as soon as the contacts 83 on the cam switch 26 close, an energizing circuit is established for the transfer switch 39, which circuit may be traced from the previously energized interlock contact 271 on the braking switch 34 through the conductors 272 and 280, the conducting finger 98, the conducting segment 96, a conductor 281, the interlock contacts 282 on the cushioning contactor 38, the conductors 227 and 279, the contacts 83 and by way of the conductors 217 and 218 to the energizing winding of the transfer switch 39 and the negative source of control energy.

Thus, the transfer switch is operated to its uppermost position and the brush arm 58 continues to operate until it reaches its B position, in which position the contact 87 engages the contact 88 so as to energize the stop coil 80 and stop the movement of the brush arm 58. Thus, the circuit connections shown in Fig. 5 are established during the coasting operation.

It will be remembered that operation of the transfer switch 39 to its uppermost position during either accelerating or braking is effective to deenergize the winding 68 on the operating device 24. During coasting, however, a bypass circuit is established which maintains the winding 68 energized, regardless of the position of the transfer switch 39. This bypass circuit may be traced from the previously energized interlock contact 261 on the braking switch 34 through the conductors 262, 267, and 283, the cam switch 145, which is closed when the braking controller 29 is in its off position, a conductor 284, the interlock contacts 285 on the braking switch 34, and by way of the conductors 286 and 205 to the winding 68 and the negative source of control energy.

As soon as the braking controller 29 is operated to its service position to unshunt the fields and initiate braking, as described above, the energizing circuit just traced for the winding 68 is interrupted at the cam switch 145 and since the transfer switch 39 is in its uppermost position, the operating device 24 immediately begins to move the brush arm 58 from its B position toward its A position, the remainder of the braking cycle thereupon being carried out as described above.

If the vehicle is operating at a still lower speed, say 25 miles per hour, the spotting relay operates exactly as described in connection with the 35 mile per hour operation, except that the conducting finger 98 comes to rest half way down the conducting surface 96 and accordingly the contacts 87 and 88 will close when the brush arm reaches a position midway between its A and B positions. Thus, the remainder of the circuit connections being as shown in Fig. 5, braking is initiated with all of the resistor 19 and half of the resistor 18 excluded from the braking circuit.

At a speed of approximately 20 miles per hour, the cam disk 94 is latched in such a position that the conducting finger 98 engages the conducting surface 97 adjacent its crest. In this position the contacts 87 and 88 are maintained closed and accordingly the stop coil 80, being energized, the brush arm 58 remains in its A position. An energizing circuit is completed, however, through the conducting segment 97 which immediately effects closure of the cushioning contactor 38 to establish the circuit connections shown in Fig. 6. This energizing circuit for the cushioning contactor 38 extends from the conducting finger 98 which is energized through a circuit previously described, the conducting segment 97, and by way of the conductors 287, 275, 196, and 197 to the energizing winding of the cushioning contactor 38.

Thus, as soon as the braking controller 29 is operated to unshunt the motor fields and to interrupt at the cam switch 145 the energizing circuit for the stop coil 80, the brush arm 58 begins to move from its A position toward its B position and the remainder of the braking cycle is carried out, as described above. The same operation occurs if braking is initiated with the vehicle operating at a speed of say 15 miles per hour, except that in this case the conducting finger 98 comes to rest part way up the conducting surface 97 and the contacts 87 and 88 are thus open. Accordingly, the brush arm 58 moves toward its B position until the contacts 87 and 88 close to energize the stop coil 80, the circuit connections thus established prior to braking being identical with those shown in Fig. 6 except that half of the resistor 18 is excluded from the braking circuit.

If braking is initiated at a still lower speed, say 10 miles per hour, the cam disk 94 occupies its extreme right-hand position, the contact finger coming to rest at the uppermost end of the conducting surface 97. Thus, the cushioning contactor 38 is immediately energized, as described above, and the brush arm 58 moves all the way to its B position before the contacts 87 and 88 close. As soon as the brush arm 58 reaches its B position, the transfer switch 39 is energized through closure of the contacts 83 on the cam switch 26 and accordingly the circuit connections shown in Fig. 7 are established prior to braking.

It will now be apparent that the spotting operation which predetermines the resistance initially included in the braking circuit is quickly accomplished at low speeds, without waiting for the brush arm 58 to move through two or three trips, by arranging the conducting segments 96 and 97, as described above. With this arrangement, spotting is accurately accomplished while moving the brush arm through a maximum of one trip between its A and B positions.

It is sometimes desirable, after braking has been established, to permit the vehicle to coast for a short time and then to reestablish the braking. In order that the braking circuits may be maintained during this coasting operation so that braking will become effective immediately at the termination of the coasting operation, the spotting relay 40 is provided with an additional latch coil 288 which is connected across the resistor 21 by means of the conductors 289 and 290. As soon as an appreciable braking current flows through the resistor 21, which is at all times connected in the braking circuit, the winding 288 is sufficiently energized so as to operate the armature 93 of the spotting relay and release the latch 106. Since the energizing winding 103 of the spotting relay is de-energized, its circuit being interrupted at the interlock contacts 233 on the line breaker 31, the cam disk 94 immediately moves to its extreme left-hand or biased position shown in Fig. 1.

In this position the contacts 87 and 88 are maintained closed at all times, regardless of the position of the brush arm 58 and accordingly as soon as the braking controller 29 is operated to its off position to establish coasting, the stop coil 80 is energized to arrest the brush arm 58 in the position it then occupies. Operation of the braking controller to its off position is of course effective to kill the braking action since the operating winding of the valve 45 of the field shunting means 23 is deenergized so as to shunt the motor fields, the deenergization of the windings of the valve 45 being accomplished by the opening of the cam switch 144 on the braking controller.

It is also sometimes desirable to accelerate the car, to brake momentarily, and then to return to acceleration by operating the master controller 28 to the switching position only. This sequence of operation is provided for by the special construction of the cam switch 126 shown in Figs. 11 and 12. It is of course necessary that the cam switch 126 shall open to deenergize the latch coil 108 as soon as the master controller moves from its running position to the switching position, as otherwise the spotting accomplished during motoring operation would be lost. If, however, the cam switch 126 is always open in the switching position, the above sequence of operation would result in a condition such that the relay could not spot properly.

It will be remembered that whenever braking is initiated, the winding 288 is energized to unlatch the cam disk 94 which immediately moves to the biased position shown and if the cam switch 126 remains open when the master controller is subsequently moved to its switching position, the spotting relay will remain locked in this biased position and it will be necessary for the controller to move through its entire sequence the four trips when the next braking operation is initiated, regardless of the speed at which the vehicle is operating. With the cam switch 126 arranged as described above, however, to close each time that the master controller is moved from its off position to the switching position, the relay is unlatched by closure of the cam switch 126 and accordingly the spotting operation takes place in the switching position, the operating winding 103 being connected across a section of the resistor 20 in the switching position, as described hereinbefore.

While we have shown a particular embodiment of our invention, it will be understood, of course, that we do not wish to be limited thereto since many modifications may be made and we, therefore, contemplate by the appended claims to cover any such modifications as fall within the true spirit and scope of our invention.

What we claim as new and desire to secure by Letters Patent of the United States, is:

1. In a control system, the combination of a traction motor, a braking resistance, means including a controller for connecting said motor in a braking circuit with said resistance, said controller being operable to vary the resistance in said braking circuit, relay means operable through a plurality of positions in response to the speed of said motor, and means controlled by the position of said relay for operating said controller to a predetermined position corresponding to the position of said relay prior to initiation of a braking operation to thereby predetermine the amount of said resistance initially included in said braking circuit to give a predetermined braking torque.

2. In a control system for an electric vehicle, the combination of a traction motor having a series field winding, a braking resistance, means including a controller for connecting said motor in a braking circuit with said resistance, said controller being operable between predetermined limits to vary the resistance in said braking circuit, relay means operable through a plurality of positions in accordance with the speed of said motor, and means including connections established by said relay for operating said controller to a predetermined position prior to initiation of a braking operation to predetermine the amount of said resistance initially included in said braking circuit, thereby to insure quick build-up of the dynamic braking current.

3. In a control system for an electric vehicle, the combination of a traction motor having a series field winding, a braking resistance, means including a controller for connecting said motor in a motoring or a braking circuit with said resistance, said controller being operable between predetermined limits to vary the resistance in said braking circuit, relay means operable through a plurality of positions in response to the speed of said motor, means responsive to movement of said controller from a motoring position to an off position for latching said relay in any one of said positions, and means controlled by the position of said relay for operating said controller to a predetermined position corresponding to the position of said relay prior to initiation of a braking operation to predetermine the amount of said resistance initially included in said braking circuit.

4. In a control system for an electric vehicle or the like, the combination of a traction motor, a motor controlling resistance, master control means for selectively connecting said motor in circuit with said resistance for braking or for acceleration, a controller operable between predetermined limits for varying said resistance, relay means operable through a plurality of positions in accordance with the speed of said motor during motoring operation, means for latching said relay in any one of said positions upon operation of said master control means from its motoring position to its off position, and means including circuit connections established by said relay in its latched position for operating said controller while said master control means is in its off position to predetermine the amount of resistance included in said braking circuit thereby to insure quick build-up of the dynamic braking current upon operation of said master control means to its braking position.

5. In a control system for an electric vehicle, the combination of a traction motor having an armature and a series field winding, a motor controlling resistance for connection in circuit with said motor, a controller operable between predetermined limits for varying said resistance, master control means movable between a running position, a coasting position, and a braking position for selectively connecting said motor and said resistance in an accelerating or a braking circuit, relay means operable through a plurality of positions in accordance with the speed of said motor when said master control means is in said running position, means responsive to movement of said master control means to said coasting position for latching said relay means in a position corresponding to the speed of said motors at the instant said master control means is so moved, and means including circuit connections established by said relay means for operating said controller to vary said resistance in accordance with the latched position of said relay means for predetermining the amount of resistance included in said motor circuit, whereby the braking current builds up quickly upon operation of said master control means to its braking position.

6. In a control system for an electric vehicle, the combination of a traction motor having an armature and a series field winding, a motor controlling resistance for connection in circuit with said motor, a controller operable between predetermined limits for varying said resistance, master control means movable between a running position, a coasting position, and a braking position for selectively connecting said motor and said resistance in an accelerating or a braking circuit, relay means for predetermining the amount of said resistance for inclusion in circuit with said motor upon initiation of a braking operation, said relay means comprising an operating element movable through a plurality of positions in accordance with the speed of said motor during running operation, means responsive to movement of said master control means to said coasting position for latching said relay operating element in any one of said positions, a plurality of relay contacts controlled by said operating element, and means including said relay contacts for operating said controller to predetermine in accordance with the latched position of said relay means the amount of resistance for inclusion in the braking circuit, thereby to insure quick build-up of the braking current upon movement of said master control means to said braking position.

7. In a control system for an electric vehicle, the combination of a traction motor having an armature and a series field winding, a motor controlling resistance for connection in circuit with said motor, a controller operable between predetermined limits for varying said resistance, master control means movable between a running position, a coasting position, and a braking position for selectively connecting said motor and said resistance in an accelerating or a braking circuit, relay means including an operating element movable in accordance with the speed of said motor, cam means operable by said element through a plurality of positions, means responsive to movement of said master control means to said coasting position for latching said cam means in a position corresponding to the speed of said motor at the instant said master control means is operated to said coasting position, contact means controlled by said cam means, means including circuit connections established upon operation of said master control means to said coasting position for operating said controller to vary said resistance, and means including said contact means for stopping said controller to predetermine in accordance with the position of said cam means the amount of resistance initially included in said braking circuit thereby to insure quick build-up of the braking current upon movement of said master control means to said braking position.

8. In a control system for an electric vehicle, the combination of a traction motor, a variable resistor, a fixed resistor, switching means including a controller associated with said variable resistor for connecting all of said resistors in circuit with said motor to establish dynamic braking when said vehicle is operating at a predetermined high speed, said controller being operable between two positions to exclude said variable resistor from the circuit, means for operating said controller between said two positions and for thereafter operating said switch means to exclude one of said fixed resistors and to reinsert said variable resistor thereby progressively to exclude said resistors from the motor circuit, and means controlled by said switching means and responsive to the speed of the vehicle prior to the initiation of a braking operation for immediately excluding said fixed resistor and a portion of said variable resistor whereby the amount of resistance to be initially included in the braking circuit is quickly adjusted in accordance with the speed of the vehicle.

9. In a control system for an electric vehicle, the combination of a traction motor, a variable resistor, a plurality of fixed resistors, switching means including a controller associated with said variable resistor for connecting all of said resistors in circuit with said motor to establish dynamic braking when said vehicle is operating at a predetermined high speed, said controller being operable between two positions to exclude said variable resistor from the circuit, means for operating said controller through four trips between said two positions and for operating said switch means at the end of each trip to exclude one of said fixed resistors and to reinsert said variable resistor thereby progressively to exclude said resistors from the motor circuit, and means responsive to the speed of the vehicle at the initiation of a braking operation for immediately operating said switching means to exclude certain of said fixed resistors and for operating said controller to exclude a portion of said variable resistor whereby the amount of resistance initially included in the braking circuit is quickly adjusted in accordance with the speed of the vehicle while operating said controller through a maximum of one trip.

10. In a control system for an electric vehicle, the combination of a traction motor, a variable resistor, a plurality of fixed resistors, switching means including a controller associated with said variable resistor for connecting all of said resistors in circuit with said motor to establish dynamic braking when said vehicle is operating at a predetermined high speed, said controller being operable between two positions to exclude said variable resistor from the circuit, means for operating said controller through four trips between said two positions and for operating said switch means at the end of each trip to exclude one of said fixed resistors and to reinsert said variable resistor thereby progressively to exclude said resistors from the motor circuit, relay means responsive to the speed of said vehicle for predetermining the amount of resistance initially included in the braking circuit in accordance with the speed at which said vehicle is operating when braking is initiated, and means controlled by said relay means for operating said switching means independently of said controller to exclude certain of said fixed resistors and for operating said controller through a portion of one trip to exclude a portion of said variable resistor, whereby the amount of resistance initially included in the braking circuit is quickly adjusted while operating said controller through a maximum of one trip.

11. In a control system for an electric vehicle, the combination of a traction motor, a variable resistor, a plurality of fixed resistors, master control means movable between a running position, a coasting position, and a braking position, switching means including a controller associated with said variable resistor for selectively connecting said motor and said resistors in an accelerating or a braking circuit upon operation of said master control means, said controller being operable between two positions progressively to exclude said variable resistor from the circuit, means responsive to movement of said master control means to said coasting position for operating said switching means to connect all of said resistors in circuit with said motor for dynamic braking when said vehicle is operating at a predetermined speed, means responsive to movement of said master control means to said braking position for operating said controller through four trips between said two positions and for operating said switching means at the end of each trip to exclude one of said fixed resistors and to reinsert said variable resistor thereby progressively to exclude said resistors from the braking circuit, relay means operable through a plurality of positions in accordance with the speed of the vehicle when said master control means is in said running position, means for latching said relay means in a corresponding position upon operation of said master control means to said coasting position, and means including circuit connections established by said relay when latched in a position corresponding to a speed less than said predetermined speed for immediately operating said switching means to exclude certain of said fixed resistors independently of said controller and for operating said controller through a portion of one trip to exclude a portion of said variable resistor, whereby the amount of resistance included in said braking circuit upon operation of said master control means to said braking position is adjusted during coasting in accordance with the speed of the vehicle, the maximum operation of said controller during coasting being one trip between said two positions.

12. In a control system for an electric vehicle, the combination of a traction motor, a variable resistor, a plurality of fixed resistors, master control means movable between a running position, a coasting position, and a braking position, switching means including a controller associated with said variable resistor for selectively connecting said motor and said resistors in an accelerating or a braking circuit upon operation of said master control means, said controller being operable between two positions progressively to exclude said variable resistor from the circuit, means responsive to movement of said master control means to said coasting position for operating said switching means to connect all of said resistors in circuit with said motor for dynamic braking when said vehicle is operating at a predetermined speed, means responsive to movement of said master control means to said braking position for operating said controller through four trips between said two positions and for operating said switching means at the end of each trip to exclude one of said fixed resistors and to reinsert said variable resistor thereby progressively to exclude said resistors from the braking circuit, relay means including an operating element movable in accordance with the speed of said motor when said master control means is in said running position, cam means operable by said element through a plurality of positions, means for latching said cam means in a position corresponding to the speed of said motor upon operation of said master control means to said coasting position, contacts controlled by said cam means, and means including circuit connections established by said contacts when said cam means is latched in a position corresponding to a speed less than said predetermined speed for immediately operating said switching means to exclude certain of said fixed resistors independently of said controller and for operating said controller to vary said variable resistor, whereby the amount of resistance included in said braking circuit upon operation of said master control means to said braking position is adjusted during coasting in accordance with the speed of said motor, the maximum operation of said controller during coasting being one trip between said two positions.

13. In a motor control system, the combination of a motor, a controller for said motor, operating means for said controller, means energizable to stop said controller, relay contacts arranged upon closure to energize said stop means, means including an operating winding energizable in accordance with the motor current for closing said contacts to energize said stop means, and means including a winding energizable simultaneously with said stop means upon closure of said contacts for opposing said operating winding to open said contacts, whereby a vibrating operation of said contacts is obtained to control the energization of said stop means.

14. In a motor control system, the combination of an electric motor, a motor controlling resistor connected in circuit therewith, a controller operable between predetermined limits for varying said resistor, means for operating said controller, means energizable to stop said operating means, normally open relay contacts arranged upon closure to energize said stop means, means including an operating winding energizable in accordance with the motor current for closing said contacts to energize said stop means when the motor current exceeds a predetermined value, and means including a bucking winding energizable simultaneously with said stop means upon closure of said contacts for opposing said operating winding to open said contacts immediately after closure thereof whereby said contacts vibrate between open and closed circuit position to control the speed of movement of said controller.

15. In a motor control system, the combination of a motor having an exciting field winding, control means for accelerating said motor including field varying means for progressively varying substantially the field excitation of said motor, pressure responsive means for progressively operating said field varying means, valve means for applying fluid pressure to said pressure responsive means, and means responsive to the current in said motor for controlling said valve means to vary the rate of change of the field excitation of said motor.

16. In a motor control system, the combination of a motor having an exciting field winding, control means for accelerating said motor including field shunting means for reducing substantially the field excitation of said motor during the initial and the final acceleration, said field shunting means including a plurality of field shunting contacts, pressure responsive means for sequentially operating said contacts between open and closed circuit positions, means including an exhaust passageway for selectively applying fluid pressure to or exhausting pressure from said pressure responsive means to operate said contacts, valve means for selectively restricting said exhaust passageway, and means responsive to the motor current for controlling said valve means to vary the rate at which said field shunting contacts are progressively operated.

17. In a motor control system, the combination of a motor having an exciting field winding, control means for accelerating said motor including field shunting means for reducing substantially the field excitation of said motor during the initial and the final acceleration, said field shunting means including a plurality of normally closed field shunting contacts, pressure responsive means including an exhaust passageway for sequentially operating said contacts between open and closed circuit positions, means for applying fluid pressure to said pressure responsive means to operate said contacts to open circuit position progressively to unshunt said motor field winding during initial acceleration of said motor and for connecting said pressure responsive means to said exhaust passageway to return said contacts to said closed circuit position progressively to shunt said motor field winding during final acceleration of said motor, valve means for controlling the flow of fluid medium through said exhaust passageway and means responsive to the motor current for controlling said valve means to vary the rate at which said field winding is shunted during final acceleration of said motors.

18. In a motor control system, the combination of a motor having an exciting field winding, control means for accelerating said motor including field shunting means for reducing substantially the field excitation of said motor during the initial and the final acceleration, said field shunting means including a plurality of normally closed field shunting contacts, pressure responsive means including an exhaust passageway for sequentially operating said contacts between open and closed circuit positions, means for applying fluid pressure to said pressure responsive means to operate said contacts to open circuit position progressively to unshunt said motor field winding during initial acceleration of said motor and for connecting said pressure responsive means to said exhaust passageway to return said contacts to said closed circuit position progressively to shunt said motor field winding during final acceleration of said motor, electroresponsive valve means for restricting said exhaust passageway substantially to stop movement of said field shunting contacts toward closed circuit position, relay contacts arranged upon closure to energize said valve means, means including an operating winding energizable in accordance with the motor current for closing said relay contacts, and means including a winding energizable simultaneously with said valve means upon closure of said relay contacts for opposing said operating winding to open said contacts whereby a vibrating operation of said relay contacts is obtained to control the energization of said valve means and the rate at which said field winding is shunted.

19. In a motor control system, the combination of a motor having a series field winding, a braking resistance, means for connecting said motor and said resistance in a braking circuit, and a battery connected across said field winding and a portion of said braking resistance initially to excite said field winding, the respective polarities of said battery and said braking current being so related that current flows through said battery during braking in a direction to charge said battery.

20. In a motor control system, the combination of a motor having a series field winding, a braking resistance, means for connecting said motor and said resistance in a braking circuit, and a battery connected across said field winding and a portion of said braking resistance initially to excite said field winding to ensure quick build-up of the braking current, the respective polarities of said battery and said braking current being so related that a portion of said braking current flows through said battery in a direction to charge said battery during braking.

21. In a motor control system, the combination of a motor having a series field winding, a braking resistance, means for connecting said motor and said resistance in circuit for dynamic braking, and a battery connected in parallel circuit relation with said field winding and a portion of said braking resistance for initially exciting said field winding to ensure quick build-up of the dynamic braking current, said battery being so related to the voltage drop across said field winding and said portion of said resistance during braking that a portion of the braking current flows through said battery in a direction to charge the battery during dynamic braking.

22. In a motor control system, the combination of a motor having an armature and a series field winding, a braking resistance, means for connecting said motor and said resistance in circuit for dynamic braking, a battery, and means for connecting said battery across said series field winding and a portion of said braking resistance initially to excite said field winding to ensure quick build-up of the dynamic braking current, the voltage drop across said field winding and said portion of said braking resistance when said braking current builds up being sufficient to cause a current to flow through said battery in a direction to charge the battery.

23. In a control system for an electric vehicle, the combination of a direct current, series-excited traction motor, a motor controlling resistance, master control means for selectively connecting said motor in circuit with said resistance for acceleration or for braking, relay means comprising a magnetizable stator having opposing pole pieces forming an air gap, a rotor mounted in said air gap for rotational movement between two extreme positions, a winding having a plurality of turns grouped together in parallel planes on said rotor, means biasing said rotor to one of said extreme positions wherein a portion of said winding is disposed beneath said pole pieces, means including circuit connections established upon movement of said master control means to its running position for energizing said winding in accordance with the motor current whereby a magnetic flux is produced having a component providing a magnetic field between said pole pieces to exert a torque on said rotor, movement of said rotor in response to an increase in the energization of said winding being effective simultaneously to increase said magnetic field and to move a portion of said winding out of said field whereby the net torque developed provides a stable movement of said rotor between said two extreme positions in accordance with the motor speed, means responsive to operation of said master control means to its off position for latching said rotor in a position corresponding to the motor speed, contact means controlled by said rotor, and means including circuit connections established by said contact means in accordance with the latched position of said rotor for varying said resistance during coasting of said vehicle to predetermine the amount of resistance for inclusion in said braking circuit.

24. In a control system for an electric vehicle, the combination of a direct current traction motor having a series-field winding, a motor controlling resistance for connection in circuit with said motor, control means for varying said resistance, master control means movable between a running position, a coasting position, and a braking position for selectively connecting said motor and said resistance in a braking or an accelerating circuit, relay means for controlling said resistance control means during coasting comprising a magnetizable stator having opposing pole pieces forming an air gap, a rotor mounted in said air gap for rotational movement between two extreme positions, a rotor winding having a plurality of turns grouped together in parallel planes, means biasing said rotor to one of said positions wherein a portion of said winding is disposed beneath said pole pieces, means responsive to operation of said master control means to said running position for connecting said rotor winding across said field winding for energization in accordance with the speed of said motor, whereby said rotor winding produces a magnetic flux having a component providing a magnetic field across said air gap to exert a torque on said rotor, movement of said rotor in response to an increase in the energization of said rotor winding being effective simultaneously to increase said magnetic field and to move a portion of said winding out of said field whereby a net torque is developed which is so related to the bias on said rotor as to provide a stable movement of said rotor between said two extreme positions in accordance with the motor speed, means responsive to movement of said master control means to said coasting position for latching said rotor in a position corresponding to the motor speed, contact means controlled by said rotor, and means including said contacts for operating said resistance control means to predetermine in accordance with the latched position of said rotor the amount of resistance included in said braking circuit when said resistor control means is operated to said braking position.

25. Means for measuring the speed of a direct current series motor comprising a magnetizable stator having opposing pole pieces forming an air gap, a rotor mounted in said air gap for rotational movement between two extreme positions, a rotor winding having a plurality of turns grouped together in parallel planes, means biasing said rotor to one of said positions wherein a portion of said winding is disposed beneath said pole pieces, means for energizing said rotor winding in accordance with the motor current whereby a magnetic flux is produced having a component which provides a magnetic field across said air gap to exert a torque on said rotor, movement of said rotor in response to a change in the energization of said winding being effective to vary the strength of said magnetic field in the same sense as said change and to vary in an opposite sense the amount of said winding disposed in said field, whereby a net torque is exerted to provide a stable movement of said rotor between said two positions in accordance with the speed of said motor.

26. Means for measuring the speed of a direct current series motor comprising a magnetizable stator having opposing pole pieces forming an air gap, a rotor mounted in said air gap for rotational movement between two extreme positions, a rotor winding having a plurality of turns grouped together in parallel planes, means biasing said rotor to one of said positions wherein a portion of said winding is disposed beneath said pole pieces, means for connecting said rotor winding across the series exciting field of said motor to energize said rotor winding in accordance with the motor speed, said rotor winding thereby producing a magnetic flux having a component which provides a magnetic field across said air gap to exert a torque on said rotor, movement of said rotor in response to an increase in the energization of said winding being effective simultaneously to increase the strength of said magnetic field and to move a portion of said rotor winding out of said field whereby a net torque is exerted to provide a stable movement of said rotor between said two positions in accordance with the speed of said motor.

27. Means for measuring the speed of a direct current series-excited motor comprising a magnetizable stator having opposing pole pieces forming an air gap, a rotor mounted in said air gap for rotational movement between a high speed position and a low speed position, a rotor winding having a plurality of turns grouped together in parallel planes, means biasing said rotor to said high speed position wherein a major portion of said winding is disposed in said air gap beneath said pole pieces, said winding when energized producing a magnetic flux having a component which produces a magnetic field across said air gap to exert a torque on said rotor, means for connecting said rotor winding across the series field of said motor, the inductive kick through said field upon initial energization of said motor being effective quickly to operate said rotor from said high speed position to said low speed position, said rotor thereafter returning to said high speed position as the speed of said motor increases, movement of said rotor toward said high speed position as the energization of said winding decreases being effective simultaneously to decrease the strength of said magnetic field across said air gap and to increase the portion of said winding disposed in said magnetic field across said air gap whereby a net torque is produced which is so related to said biasing means as to provide a stable movement of said rotor from said low speed to said high speed position which directly corresponds to the speed of said motor.

JOHN F. TRITLE.
JACOB W. McNAIRY.